US012769807B2

(12) United States Patent
Yang et al.

(10) Patent No.: US 12,769,807 B2
(45) Date of Patent: Oct. 20, 2026

(54) METHOD, APPARATUS, ELECTRONIC DEVICE AND MEDIUM FOR TRAINING MODELS

(71) Applicant: EMC IP Holding Company LLC, Hopkinton, MA (US)

(72) Inventors: Wenbin Yang, Shanghai (CN); Jiacheng Ni, Shanghai (CN); Qiang Chen, Shanghai (CN); Zijia Wang, WeiFang (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1182 days.

(21) Appl. No.: 17/528,388

(22) Filed: Nov. 17, 2021

(65) Prior Publication Data

US 2023/0129870 A1 Apr. 27, 2023

(30) Foreign Application Priority Data

Oct. 22, 2021 (CN) ......................... 202111235589.X

(51) Int. Cl.
*G06F 18/214* (2023.01)
*G06F 18/213* (2023.01)
(Continued)

(52) U.S. Cl.
CPC .......... *G06F 18/214* (2023.01); *G06F 18/213* (2023.01); *G06F 18/22* (2023.01); *G06N 20/00* (2019.01)

(58) Field of Classification Search
CPC ...... G06F 18/214; G06F 18/22; G06F 18/213; G06N 20/00
(Continued)

(56) References Cited

U.S. PATENT DOCUMENTS

2020/0394460 A1* 12/2020 Shiraishi .............. G06V 10/772
2021/0027169 A1* 1/2021 Kanan .................... G06N 20/00
(Continued)

FOREIGN PATENT DOCUMENTS

CN 107276702 A * 10/2017 ........... H04B 17/382
CN 111723675 A 9/2020
(Continued)

OTHER PUBLICATIONS

Arora et al., Similarity-based Clustering by Left-Stochastic Matrix Factorization, Jan. 1, 2013 (Year: 2013).*
(Continued)

*Primary Examiner* — Usmaan Saeed
(74) *Attorney, Agent, or Firm* — Ryan, Mason & Lewis, LLP

(57) ABSTRACT

Embodiments of the present disclosure provide a method and an apparatus for training a model, an electronic device, and a medium. This method includes: generating a first group of features and a second group of features respectively from a first sample set and a second sample set based on the model, wherein the first sample set is of a first category, and the second sample set is of a second category different from the first category; generating a first similarity matrix for the first sample set and the second sample set based on the first group of features and the second group of features; determining a first loss for the first sample set and the second sample set based on the first similarity matrix; and updating the model based on the first loss.

20 Claims, 7 Drawing Sheets

(51) Int. Cl.
*G06F 18/22* (2023.01)
*G06N 20/00* (2019.01)

(58) Field of Classification Search
USPC .......................................................... 706/25
See application file for complete search history.

(56) References Cited

U.S. PATENT DOCUMENTS

| | | | | |
|---|---|---|---|---|
| 2021/0089724 | A1* | 3/2021 | Luong | G06F 40/30 |
| 2021/0319266 | A1* | 10/2021 | Chen | G06F 18/2155 |
| 2021/0326660 | A1* | 10/2021 | Krishnan | G06N 3/084 |
| 2021/0374570 | A1* | 12/2021 | Cheng | G06N 3/096 |
| 2021/0397970 | A1* | 12/2021 | Cherian | G06N 3/0895 |
| 2022/0156591 | A1* | 5/2022 | Li | G06F 18/22 |
| 2022/0269946 | A1* | 8/2022 | Zhou | G06N 3/084 |
| 2022/0318466 | A1* | 10/2022 | Jayaraman | G06T 17/30 |

FOREIGN PATENT DOCUMENTS

| | | | | |
|---|---|---|---|---|
| CN | 113326852 | A * | 8/2021 | G06V 10/44 |
| JP | 2019074946 | A * | 5/2019 | |
| JP | 2022180064 | A * | 12/2022 | G06V 10/82 |
| WO | 2019100724 | A1 | 5/2019 | |

OTHER PUBLICATIONS

Kundu et al., Efficient algorithms for learning kernels from multiple similarity matrices with general convex loss functions, 2010 (Year: 2010).*

Song et al., A Comparative Study of Dimensionality Reduction Techniques to Enhance Trace Clustering Performances, Jul. 2013 (Year: 2013).*

Zhuang et al., "A Comprehensive Survey on Transfer Learning", Jun. 23, 2020, (Year: 2020).*

Que et al., "A Similarity Measurement with Entropy-Based Weighting for Clustering Mixed Numerical and Categorical Datasets", Jun. 15, 2021, (Year: 2021).*

J. Pang et al., "Quasi-Dense Similarity Learning for Multiple Object Tracking," arXiv:2006.06664v4, Sep. 8, 2021, 16 pages.

Y. Yu et al., "Learning Diverse and Discriminative Representations via the Principle of Maximal Coding Rate Reduction," arXiv:2006.08558v1, Jun. 15, 2020, 28 pages.

J. Wu et al., "Deep Comprehensive Correlation Mining for Image Clustering," arXiv:1904.06925v3, Aug. 12, 2019, 13 pages.

U. Von Luxburg, "A Tutorial on Spectral Clustering," arXiv:0711.0189v1, Nov. 1, 2007, 32 pages.

M. Rosvall et al., "Maps of Random Walks on Complex Networks Reveal Community Structure," arXiv:0707.0609v3, Nov. 12, 2007, 62 pages.

A. Milan et al., "MOT16: A Benchmark for Multi-Object Tracking," arXiv:1603.00831v2, May 3, 2016, 12 pages.

* cited by examiner

METHOD, APPARATUS, ELECTRONIC DEVICE AND MEDIUM FOR TRAINING MODELS

RELATED APPLICATION(S)

The present application claims priority to Chinese Patent Application No. 202111235589.X, filed Oct. 22, 2021, and entitled "Method, Apparatus, Electronic Device and Medium for Training Models," which is incorporated by reference herein in its entirety.

FIELD

Embodiments of the present disclosure relate to the field of computers and, more particularly, to the technical field of artificial intelligence. Embodiments of the present disclosure include a method and an apparatus for training a model, an electronic device, a medium, and a computer program product.

BACKGROUND

With the development of the artificial intelligence technology, a training mechanism of self-supervised learning has emerged. Self-supervised learning can adopt a self-defined dummy tag as supervision to avoid the labeling cost of a data set, and features obtained via self-supervised learning can be applied to various types of downstream tasks. In self-supervised learning, contrastive learning has recently been widely applied to computer vision, natural language processing (NLP), and other fields.

SUMMARY

The present disclosure provides a technical solution for training a model based on contrastive learning.

According to a first aspect of the present disclosure, a method for training a model is provided, including: generating a first group of features and a second group of features respectively from a first sample set and a second sample set based on the model, wherein the first sample set is of a first category, and the second sample set is of a second category different from the first category; generating a first similarity matrix for the first sample set and the second sample set based on the first group of features and the second group of features; determining a first loss for the first sample set and the second sample set based on the first similarity matrix; and updating the model based on the first loss.

According to a second aspect of the present disclosure, an apparatus for training a model is provided, including: a feature generating unit, configured to generate a first group of features and a second group of features respectively from a first sample set and a second sample set based on the model, wherein the first sample set is of a first category, and the second sample set is of a second category different from the first category; a similarity matrix generating unit, configured to generate a first similarity matrix for the first sample set and the second sample set based on the first group of features and the second group of features; a loss determining unit, configured to determine a first loss for the first sample set and the second sample set based on the first similarity matrix; and a model updating unit, configured to update the model based on the first loss.

According to a third aspect of the present disclosure, an electronic device is provided, including: at least one processing unit; and at least one memory that is coupled to the at least one processing unit and stores instructions for execution by the at least one processing unit, wherein the instructions, when executed by the at least one processing unit, cause the electronic device to perform the method according to the first aspect of the present disclosure.

According to a fourth aspect of the present disclosure, a computer-readable storage medium is provided, including machine-executable instructions, wherein the machine-executable instructions, when executed by a device, cause the device to perform the method according to the first aspect of the present disclosure.

According to a fifth aspect of the present disclosure, a computer program product is provided, including machine-executable instructions, wherein the machine-executable instructions, when executed by a device, cause the device to perform the method according to the first aspect of the present disclosure.

It should be understood that this Summary is neither intended to identify key or essential features of embodiments of the present disclosure, nor intended to limit the scope of the present disclosure. Other features of the present disclosure will become readily understood from the following description.

BRIEF DESCRIPTION OF THE DRAWINGS

The above and other objectives, features, and advantages of embodiments of the present disclosure will become more readily understandable through the following detailed description with reference to the accompanying drawings. In the accompanying drawings, a plurality of embodiments of the present disclosure will be illustrated by way of example and not limitation, where.

DETAILED DESCRIPTION

Figure 1:
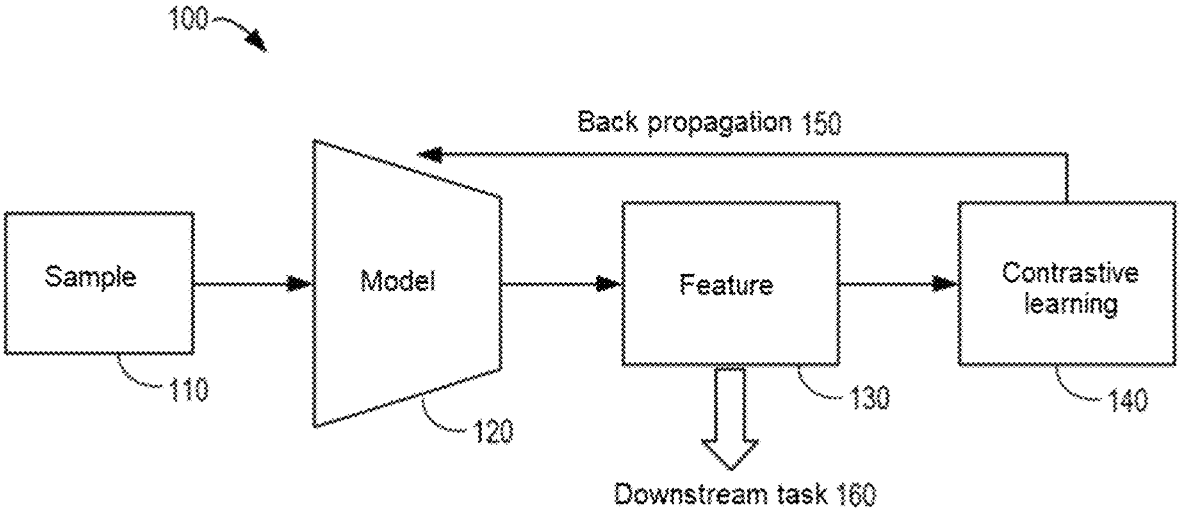
FIG. 1 illustrates a schematic diagram of an example environment in which multiple embodiments of the present disclosure can be implemented.

Principles and concepts of the present disclosure will now be illustrated with reference to various example embodiments shown in the accompanying drawings. It should be understood that these embodiments are described only for the purpose of enabling a person skilled in the art to better understand and then implement the present disclosure, instead of limiting the scope of the present disclosure in any way. It should be noted that similar or identical reference signs may be used in the drawings where feasible, and similar or identical reference signs may indicate similar or identical elements. Those skilled in the art will understand that from the following description, alternative embodiments of the structures and/or methods described herein may be adopted without departing from the principles and concepts of the present disclosure described.

In the context of the present disclosure, the term "include" and various variants thereof can be understood as open terms, meaning "including but not limited to." The term "based on" can be understood as "based at least in part on." The term "one embodiment" can be understood as "at least one embodiment." The term "another embodiment" can be understood as "at least one additional embodiment." Other terms that may appear but are not mentioned here, unless explicitly stated, should not be interpreted or limited in a manner that is contrary to the principles and concepts on which embodiments of the present disclosure are based.

Basic principles and implementations of the present disclosure are illustrated below with reference to the drawings. It should be understood that example embodiments are provided only to enable those skilled in the art to better understand and then implement embodiments of the present disclosure, and not to limit the scope of the present disclosure in any way.

As a self-supervised learning mechanism, contrastive learning has been widely applied. Although it has achieved empirical success, there is still a lack of theoretical basis for contrastive learning, and the purpose of contrastive learning is often to obtain a better hidden space representation, rather than to obtain a discriminant representation for downstream tasks, which leads to the lack of generalization ability and robustness of a model learned through training.

Herein, inspired by the phenomenon of water-oil separation in a gravity environment, a new contrastive learning framework is provided. In short, water-oil separation means that it is equivalent to the process of minimizing the overall entropy of a system. Therefore, in the process of training a model, relationship information behind unlabeled data can be obtained by minimizing the entropy of the whole system. Inspired by this, an embodiment of the present disclosure provides a method for training a model by minimizing entropy information. In this method, a model to be trained is used to obtain corresponding features from a pair of training sample sets including a positive sample set and a negative sample set respectively. Samples in the positive sample set belong to the same category, and samples in the negative sample set belong to another category. A similarity matrix is then constructed according to similarities between these features, such as a cosine similarity. The entropy information for the pair of sample sets is obtained from the similarity matrix as a loss function. A model generating sample features can be trained by minimizing the entropy information. By applying the training method of the embodiment of the present disclosure, the trained model can generate a better feature representation, has a better generalization ability, and is more robust and interpretable.

It is helpful to introduce symbols used herein first.

For a graph G, it is generally described by a set V of points and a set E of edges. That is, G(V,E), where V is all points ($v_1$, $v_2$ . . . $v_n$) in a data set. For any two points in V, there can be edge connection or no edge connection. A weight $w_{ij}$ is defined as a weight between a point $v_i$ and a point $v_j$. For an undirected graph, there is $w_{ij}=w_{ji}$.

For two points $v_i$ and $v_j$ having an edge connection, $w_{ij}>0$. For two points $v_i$ and $v_j$ having no edge connection, $w_{ij}=0$. For any one point $v_i$ in the graph, its degree $d_i$ is defined as a sum of weights of all edges connected with the point, that is, $$d_i = \sum_{j=1}^{n} w_{ij} \tag{1}$$

A weight matrix $W=\mathbb{R}^{N\times N}$ is defined, and correspondingly a diagonal matrix $D=\mathbb{R}^{N\times N}$ is defined, where its elements $D_{ii}=d_i$. For a given subset $A\in V$ of the graph G, a complementary set of A in V is represented as $\overline{A}$, and A is also referred to as a subgraph. The size of the subgraph A is defined as:

$$\mathrm{vol}(A) = \sum_{i\in A} d_i \tag{2}$$

The size of A is measured by summing the weights of all the edges connected to points in A through vol(A). Then, for two disjoint subsets A and B in V, a slicing score is defined as:

$$\mathrm{cut}(A, B) = \sum_{i\in A, j\in B} w_{ij} \tag{3}$$

In addition, herein, elements $w_{ij}$ in the weight matrix W may adopt, but are not limited to, a similarity of data samples $x_i$ to $x_j$, such as a cosine similarity, as follows:

$$w_{ij} = sim(x_i, x_j) = \frac{(z_i^T z_j)}{|z_i||z_j|} \tag{4}$$

where $z=f(x)$, and $f(\ )$ is a feature function configured to convert the data samples into features. In this case, the weight matrix W may be referred to as a similarity matrix.

Example embodiments of the present disclosure will be described below with reference to the accompanying drawings. FIG. 1 illustrates a schematic diagram of example environment 100 in which multiple embodiments of the present disclosure can be implemented. In environment 100, samples 110 are input to model 120 to be trained. Samples 110 include positive samples and negative samples obtained from label-free data. For example, in the case that the samples are images, the images may be subjected to various enhancement operations, for example, an enhanced image is generated through brightness adjustment, size adjustment, geometric transformation, division, and the like. The original images and the enhanced images may be grouped to one category to serve as the positive samples. In some embodiments, the negative samples may include samples in one or more categories different from the category of the positive samples. In some embodiments, a sample set may be obtained from known data sets, such as CIFAR10, and images therein have known category information.

Model 120 is configured to generate corresponding features from an original data sample or an enhanced data sample. Herein, a feature may also be referred to as a representation or embedding. Model 120 may be any existing or future developed machine learning model, such as a support vector machine, a decision tree, a neural network model (e.g., a convolutional neural network, a recurrent neural network, a graph neural network), etc. Model 120 may include an input layer, a hidden layer, and an output layer. Each layer has several nodes, and each node receives the output of a previous layer of nodes and generates the output to a lower layer of nodes according to a connection weight of inter-layer nodes. The output of each layer is regarded as a vector. Generally, the number of nodes in the input layer may correspond to the dimension of sample data input to model 120, and the number of nodes in the output layer may correspond to the dimension of feature 130 output by model 120. The feature may be vectors of 128, 256, and 512 dimensions, which is not limited in the present disclosure.

In environment 100, feature 130 may be provided to contrastive learning module 140 to train model 120. Herein, training refers to a process of adjusting or updating connection weights in model 120 based on feature 130 output by model 120. Contrastive learning module 140 calculates a loss function for training data based on feature 130, and updates model 120 iteratively by minimizing the loss function. In some embodiments, contrastive learning module 140 may provide gradient information about the loss function to model 120 through back propagation 150 such that model 120 is updated according to a gradient descent method.

In environment 100, trained model 120 may extract feature 130 and provide it to downstream task 160, such as image classification, target detection, and action recognition. It should be noted that the purpose of contrastive learning training is that trained model 120 may generate similar features from samples belonging to the same category and generate features with large differences from samples belonging to different categories.

It should be understood that the environment shown in FIG. 1 is only an example environment, and embodiments of the present disclosure may also be implemented in different environments. For example, model 120 may be updated through other optimization methods, not limited to back propagation.

Figure 2:
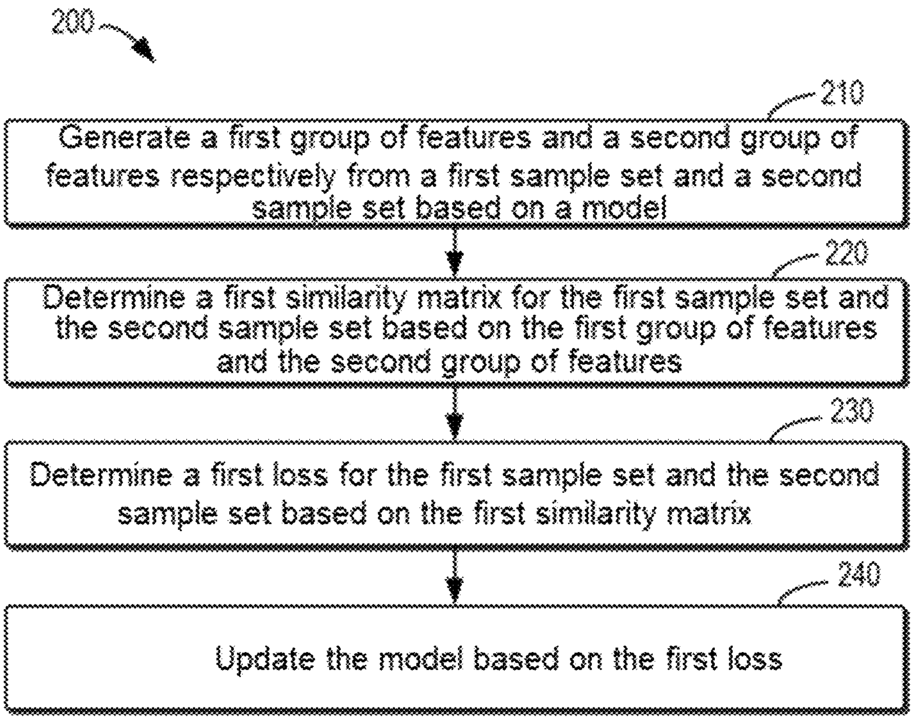
FIG. 2 illustrates a schematic flow chart of a method for training a model according to some embodiments of the present disclosure.

FIG. 2 illustrates a schematic flow chart of method 200 for training a model according to some embodiments of the present disclosure. Method 200 can be implemented in example environment 100 as shown in FIG. 1.

At block 210, a first group of features and a second group of features are generated respectively from a first sample set P and a second sample set N based on the model. The first sample set P and the second sample set N, as a whole, are used as a pair of training data. According to embodiments of the present disclosure, the first sample set P may be used as positive samples for training and includes one or more data samples, such as images. As a known fact, data samples in the positive samples are of the same first category, for example, other images in the positive samples may be obtained by operating an enhancement operation on one image. Similarly, the second sample set N may be used as negative samples for training and includes one or more data samples. Data samples in the second sample set N are of the same second category which is different from the first category.

Each data sample may be input to the model to generate features of the data sample. Therefore, a group of corresponding features may be obtained from data samples in the first sample set P, and another group of corresponding features may be obtained from data samples in the second sample set N. Depending on the structure of the model, the dimension of the features may be, for example, 128, 256 and 512, etc. Herein, the features output from the model may also be referred to as main features.

At block 220, a first similarity matrix for the first sample set P and the second sample set N is generated based on the first group of features and the second group of features. Block 220 may be performed in, for example, contrastive learning module 140 in FIG. 1. The first similarity matrix may be, for example, a matrix as shown in FIG. 3, and may be stored in contrastive learning module 140.

Figure 3:
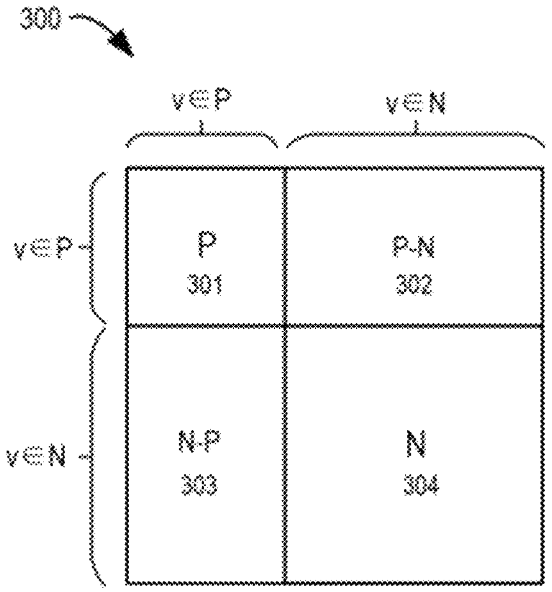
FIG. 3 illustrates a schematic diagram of a similarity matrix according to some embodiments of the present disclosure.

FIG. 3 illustrates a schematic diagram of similarity matrix 300 according to some embodiments of the present disclosure. As shown in the figure, sizes of rows and columns of similarity matrix 300 are a sum of data samples in the first sample set P and the second sample set N, and the rows and the columns correspond to samples v in the first sample set P and the second sample set N in sequence.

In some embodiments, elements in similarity matrix 300 may be determined in accordance with determining a similarity between features of data samples corresponding to rows of the elements and features of data samples corresponding to columns of the elements. The similarity $w_{ij}$ may be determined according to formula (4). Therefore, elements in block 301 of similarity matrix 300 correspond to a similarity between data samples in the first sample set P. Elements in blocks 302 and 303 correspond to the similarity between data samples in the first sample set P and data samples in the second sample set N. Elements in block 304 correspond to a similarity between data samples in the second sample set N.

In some embodiments, perturbation that may exist in data samples themselves is considered, and this perturbation may be interpreted as random transition between positive sample data and negative sample data. Therefore, in order to improve the robustness of the training method, elements in the similarity matrix are adjusted by using a perturbation factor τ.

$$w_{ij} = (1-\tau)w_{ij} + \frac{\tau}{N} \tag{5}$$

where τ>0 represents a perturbation level. In some embodiments, τ may be gradually lowered in the training process to simulate the real world.

Figure 4:
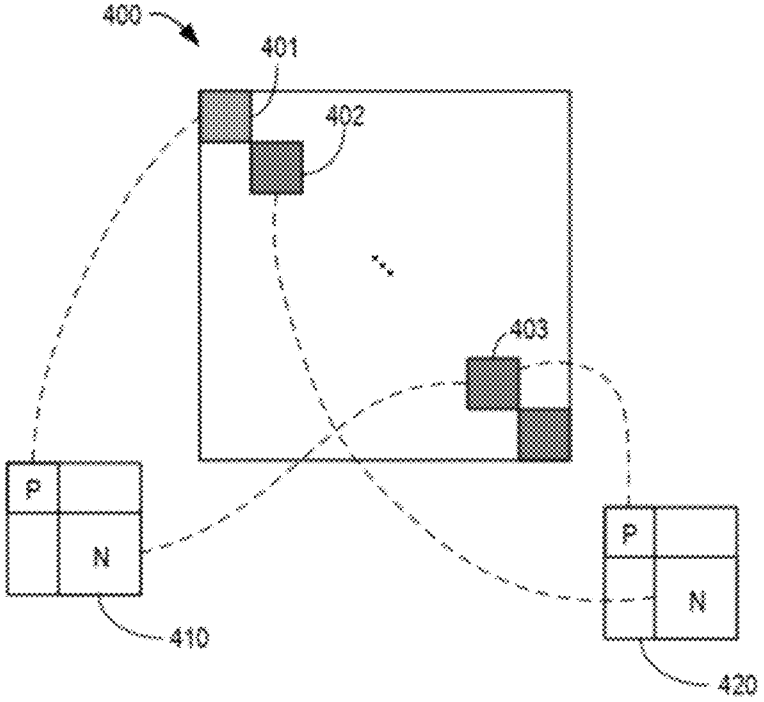
FIG. 4 illustrates a schematic diagram of a global similarity matrix and a local similarity matrix according to some embodiments of the present disclosure.

As described above, method 200 trains the model by using the dichotomic first sample set P and second sample set N to obtain similarity matrix 300. According to embodiments of the present disclosure, method 200 may further be extended to polytomic sample sets to train the model so as to obtain a global similarity matrix. FIG. 4 illustrates a schematic diagram of a global similarity matrix and a local similarity matrix according to some embodiments of the present disclosure.

Specifically, a first sample set is selected from a global sample set including a plurality of sample sets as positive samples, a second sample set is selected therefrom as negative samples, and the positive samples and the negative samples are used as a piece of training data to generate a corresponding local similarity matrix. A third sample set is selected as positive samples, a fourth sample set is selected as negative samples to form the next piece of training data, another local similarity matrix is obtained, and so on. The obtained similarity matrices may be combined to form the global similarity matrix.

As shown in FIG. 4, global similarity matrix 400 includes blocks 401, 402, and 403 corresponding to sample sets of a plurality of different categories. In some embodiments, in order to construct global similarity matrix 400, any two sample sets may be selected from the plurality of sample sets as positive samples and negative samples in one piece of training data, thereby obtaining corresponding local similarity matrices 410 and 420. Local similarity matrices 410 and 420 may be generated through descriptions referring to blocks 210 and 220 above.

Block 401 may correspond to a first category of sample sets in the plurality of sample sets, block 402 may correspond to a second category of sample sets, block 403 may correspond to a third category of sample sets, and so on. In order to obtain local similarity matrix 410, the sample set corresponding to block 401 may be selected as positive samples, and the sample set corresponding to block 403 may be selected as negative samples. Similarly, local similarity matrix 420 may be obtained by selecting the sample set corresponding to block 403 and the sample set corresponding to block 402. It should be understood that positive samples in a certain piece of training data may be negative samples in another piece of training data, for example, the sample set corresponding to block 403 is negative samples in local similarity matrix 410 and is positive samples in local similarity matrix 420.

Therefore, in the case of giving the plurality of sample sets different in category, a plurality of local similarity matrices may be obtained by selecting different sample sets from the plurality of sample sets as positive samples and negative samples and repeatedly performing the operation of generating the similarity matrix.

In some embodiments, the blocks (e.g., blocks 301, 302, 303, and 304 in FIG. 3) in the local similarity matrices may be mapped to the corresponding blocks in global similarity matrix 400, and may be normalized to generate global similarity matrix 400. In this way, the computing amount may be reduced, subsequent calculation of a global loss is not affected, and besides, the model may be more robust based on the dichotomic training process.

Referring again to FIG. 2, at block 230, a first loss for the first sample set and the second sample set is determined based on the first similarity matrix. Block 230 may be performed in, for example, contrastive learning module 140 in FIG. 1.

As described above, the first similarity matrix includes similarity information between data samples in the first sample set and the second sample set, and the loss function will be calculated based on the similarity information. The calculating process is based on inspiration from the phenomenon of oil-water separation, and the model is trained by minimizing entropy information of the training data. The problem of minimizing entropy information may be expressed as follows: in the case of converting the training data into G(V, E), edges between data samples in the positive samples have high weights and edges between data samples in the negative samples have high weights, but edges between data samples in the positive samples and data samples in the negative samples have low weights.

A process of calculating the loss (i.e., entropy information) of the training data is described below.

Based on the symbols described above, a Laplacian matrix L is defined as follows:

$$L = D - W \tag{6}$$

where D is a degree matrix, and W is a similarity matrix. The matrix L meets following attributes:

$$s^T L s = \frac{1}{2}\sum\nolimits_{i,j=1}^{n} w_{ij}(s_i - s_j)^2 \tag{7}$$

where $s \in \mathbb{R}^{N\times 1}$ is any vector. Assuming that the number of vertices of a subgraph A corresponding to the positive samples (i.e., the number of the data samples in the positive samples) and the number of vertices of a subgraph $\overline{A}$ corresponding to the negative samples (i.e., the number of the data samples in the negative samples) are $K^+$ and $K^-$, the problem of slicing optimization (classification) may be converted into the following:

$$\underbrace{\text{argmin}}_{h} \ \text{trace}\left(h^T L h\right) \text{ s.t. } h^T D h = 1 \tag{8}$$

where $h \in \mathbb{R}^{N\times 1}$ is an indication vector indicating division of the positive sample subgraph. Formula (8) describes the problem of solving the indication vector h when L is known. On the contrary, for contrastive learning, it is equivalent to solving a similarity matrix W when the indication vector is known so as to obtain a corresponding optimized Laplacian matrix L according to formula (6). The indication vector may be defined as:

$$h_i = \begin{cases} 0 & v_i \notin A \\ \dfrac{1}{\sqrt{vol(A)}} & v_i \in A \end{cases} \tag{9}$$

Thus, the problem of contrastive learning may be defined as:

$$\underbrace{\text{argmin}}_{f()} \ \text{trace}\left(h^T L h\right) \tag{10}$$

Formula (10) describes how to solve a mapping relation from the data samples to the features, that is, model 120 shown in FIG. 1 is trained to determine a function $f(\ )$.

Considering the definition of the Laplacian matrix L in formula (6) and in combination with the definition of the slicing score in formula (3), it may obtain:

$$\begin{aligned} h^T L h &= h^T D h - h^T W h = \\ \sum_{i=1}^{n} d_i h_i^2 - \sum_{i,j=1}^{n} h_i h_j w_{ij} &= \frac{1}{2}\left(\sum_{i=1}^{n} d_i h_i^2 - 2\sum_{i,j=1}^{n} h_i h_j w_{ij} + \sum_{j=1}^{n} d_j h_j^2\right) = \\ &\frac{1}{2}\sum_{i,j=1}^{n} w_{ij}(h_i - h_j)^2 = \frac{\text{cut}\left(A, \overline{A}\right)}{vol(A)} \end{aligned} \tag{11}$$

where A represents the positive samples, and $\overline{A}$ represents the negative samples. According to the definition of formula (2), item vol(A) represents the size of A, and item cut(A, $\overline{A}$) represents a sum of weights between the data samples of the positive samples and the negative samples. Therefore, the larger item vol(A), the more similar the data samples in the positive samples. The smaller item cut(A, $\overline{A}$), the less similar the data samples in the positive samples and the data samples in the negative samples.

Therefore, in some embodiments, the first loss for the first sample set and the second sample set may be calculated based on formula (11) or its variant. The advantage is that since the weight $w_{ij}$ is not greater than 1, cut(A, $\overline{A}$)≤$K^+K^-$; and thus this entropy information has a boundary, and using it as the loss is beneficial. In addition, the problem of formula (10) is stable, and the amplitude of the features does not need to be constrained.

Figure 5:
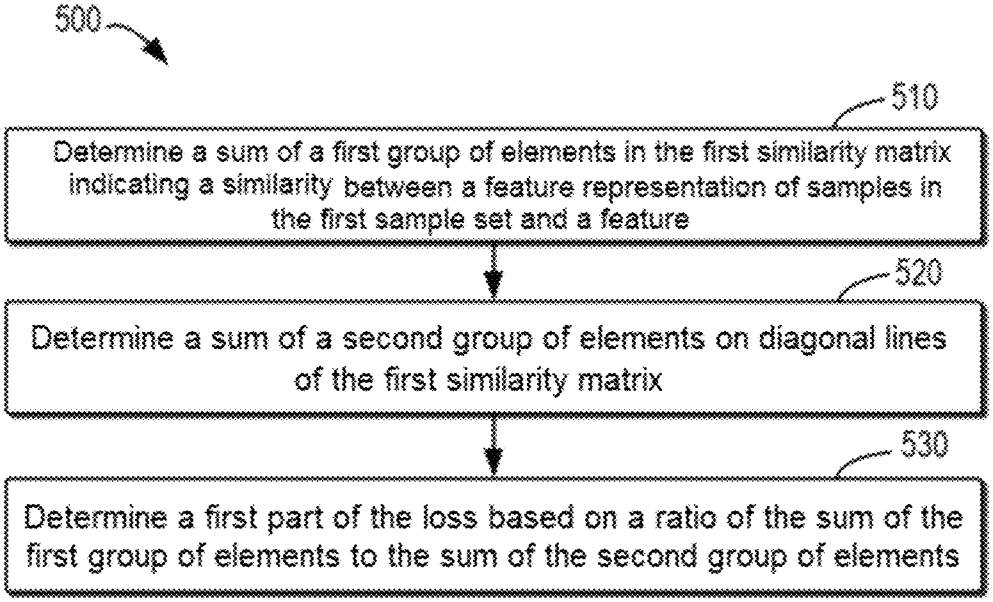
FIG. 5 illustrates a schematic flow chart of a method for determining a loss of training data according to some embodiments of the present disclosure.

FIG. 5 illustrates a schematic flow chart of method 500 for determining a loss of training data according to some embodiments of the present disclosure.

At block 510, a sum of a first group of elements in the first similarity matrix indicating a similarity between a feature representation of samples in the first sample set and a feature representation of samples in the second sample set is determined. Referring to formula (11), calculating the first loss includes determining cut(P, N). Referring to similarity matrix 300 shown in FIG. 3, that is, a sum of all the elements in blocks 302 and 303 of similarity matrix 300 is calculated.

At block 520, a sum of a second group of elements on diagonal lines of the first similarity matrix is determined. For the dichotomic case, the positive samples and the negative samples are mutual and exchangeable. In order to facilitate calculation and not to affect effectiveness, a sum of the size of the positive samples and the size of the negative samples is calculated. In some embodiments, in the case that similarities are normalized, the sum of the elements on the diagonal lines is equal to a sum of the sample data in the positive samples and the negative samples.

At block 530, a first part of the loss is determined based on a ratio of the sum of the first group of elements to the sum of the second group of elements, as shown in formula (11).

Referring again to FIG. 2, at block 240, the model is updated based on the first loss. According to embodiments of the present disclosure, in the training process, the training data may be divided into mini batches, each mini batch including a plurality of pieces of training data. A loss of a mini batch is obtained by accumulating losses generated by each piece of training data. That is, the first loss is generated from the first sample set and the second sample set, the second loss is generated from the third sample set and the fourth sample set, and so on. These losses may be accumulated to update the model.

An embodiment of the present disclosure further provides a method inspired by the phenomenon of water-oil separation and capable of bringing semantic information to the features generated by the model. In the absence of gravity in nature, water and oil cannot be completely separated, but separate water and oil droplets are formed; however, under the influence of gravity, a water-oil mixture can be separated quickly and completely. Here, the gravity makes a system more robust and compact. Therefore, a mechanism for accelerating the training process and providing semantic information to features output by the model is provided. The mechanism may also be referred to as virtual gravity.

In a d-dimension representation space, there are d mutually orthogonal bases at most. Therefore, when the number of the positive samples is greater than d, the features of the positive samples will be orthogonal. Therefore, projecting the features output by model 120 to a low-dimension space to obtain dimensionality reduction features will be beneficial.

In some embodiments, more dimensionality reduction features and more similarity matrices may be generated for each piece of training data. These similarity matrices may be configured to generate an additional loss.

Figure 6:
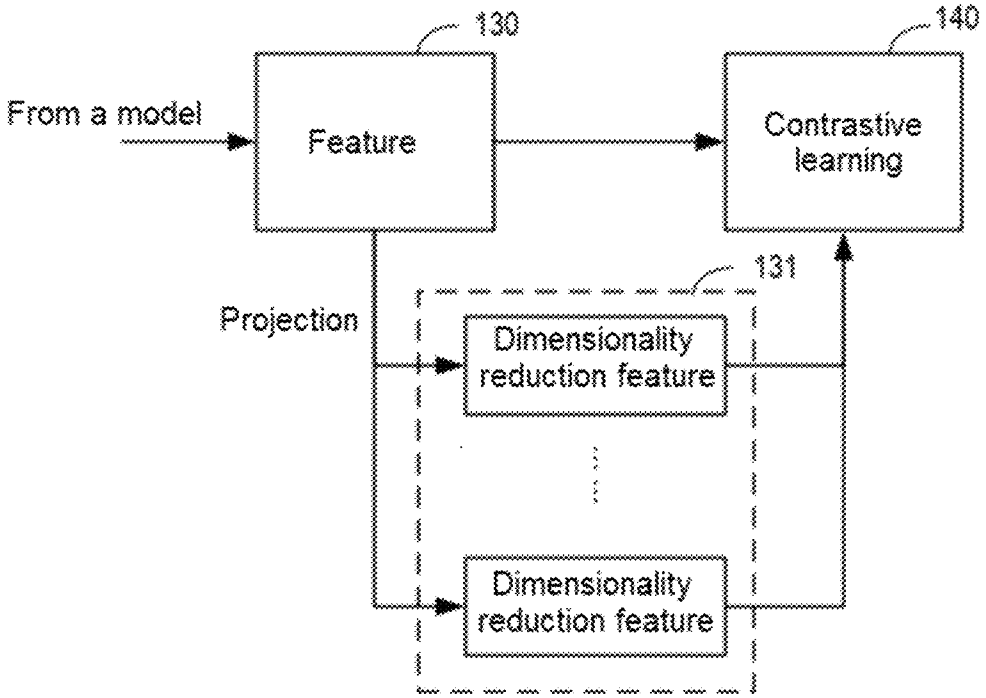
FIG. 6 illustrates a schematic diagram of a method of obtaining dimensionality reduction features for contrastive learning according to some embodiments of the present disclosure.

FIG. 6 illustrates a schematic diagram of a method of obtaining the dimensionality reduction features for contrastive learning according to some embodiments of the present disclosure.

Feature 130 directly obtained from model 120 may be referred to as the main feature. One or more dimensionality reduction features 131 for feature 130 are obtained through a projection manner, for example, feature 130 is multiplied by a projection matrix. For the training data including the positive samples and the negative samples, a group of dimensionality reduction features may be generated from the positive samples, and a group of dimensionality reduction features may be generated from the negative samples.

Feature 130 and one or more dimensionality reduction features 131 may be provided to contrastive learning module 140 to generate the corresponding similarity matrices, thereby determining the corresponding losses.

Specifically, the first group of features (main features) obtained from the first sample set P may be converted into the first group of dimensionality reduction features (main features) or more dimensionality reduction features, and the second group of features obtained from the second sample set N may be converted into the second group of dimensionality reduction features or more dimensionality reduction features. The dimension of the dimensionality-reduced features is smaller than the dimension of the main features.

The first group of dimensionality reduction features and the second group of dimensionality reduction features are provided to contrastive learning module 140 to generate a second similarity matrix. A process of generating the second similarity matrix by contrastive learning module 140 is similar to generating the first similarity matrix. Then, contrastive learning module 140 may determine a first additional loss for the first sample set P and the second sample set N based on the second similarity matrix. It should be understood that if more dimensionality reduction features are generated, more additional losses may be generated, such as a second additional loss, a third additional loss, and the like.

Then, contrastive learning module 140 may determine a final loss for updating model 120 based on the loss obtained from feature 130 and the additional loss obtained from dimensionality reduction feature 131, as shown in the following formula:

$$\mathrm{loss}(\theta) = E_{x\in\chi}\left(\sum_{k}^{K} \gamma_k h(x)^T W_k(x) h(x)\right) \tag{12}$$

where K is a total number of the features obtained from each data sample, a parameter $\gamma_k>0$ is a weight for the loss obtained from each feature, and $E_{x\in\chi}$ represents entropy solving information for training data x, namely a total loss. Model 120 is trained by contrastive learning module 140 through minimizing the total loss.

Through the above descriptions, illustrative embodiments of the present disclosure implement the method for training the model. In this method, based on the inspiration of the phenomenon of water-oil separation, contrastive learning is modeled as the process of minimizing the entropy information of the training data, such that the trained model can generate the better feature representation, has the better generalization ability, and is more robust and interpretable.

In an experiment, a CIFAR10 data set and ResNet-18 are considered. The last linear layer of ResNet-18 is replaced with two full-connection layers, and an activation function is set as ReLU, so that the dimension of the output features is 128. The size of each mini batch is set as m=128. A cross entropy is selected as a loss function of traditional learning. In the experiment, a model trained based on the cross entropy is used for a downstream image classification task, with an accuracy rate of 92.04%, and the accuracy rate of the model obtained by training based on the embodiment of the present disclosure is 95.01%.

Figure 7:
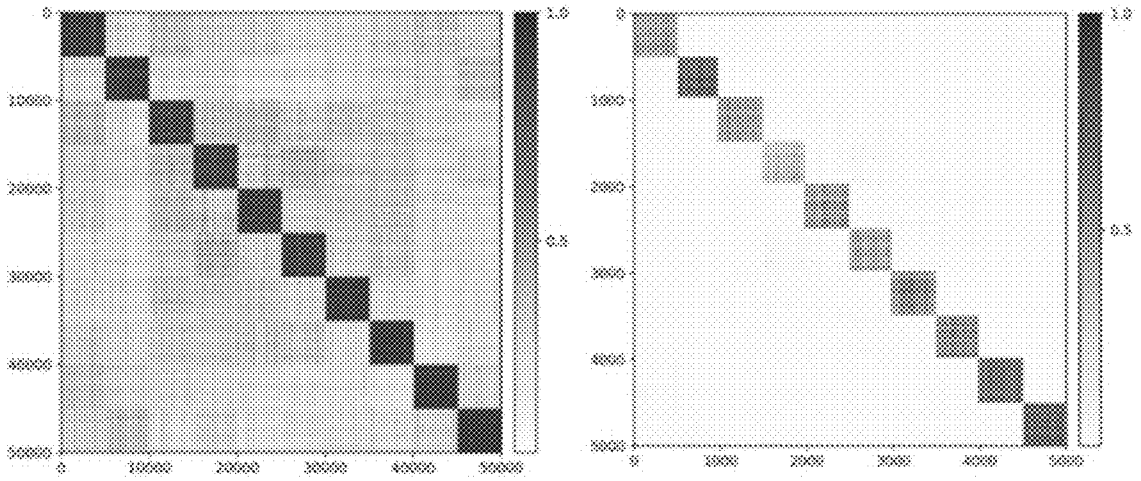
FIG. 7 illustrates a comparison diagram of features learned by applying embodiments of the present disclosure and features learned according to a traditional manner.

Similarity matrices of features output by the two models are considered. FIG. 7 illustrates a comparison diagram of features learned by applying embodiments of the present disclosure and features learned according to a traditional manner. The left is a result obtained by a traditional cross entropy manner, and the right is a result obtained according to embodiments of the present disclosure. It can be seen that in the figure on the right, a similarity of features obtained from different categories of samples is small, that is, almost all the features are orthogonal.

Figure 8:
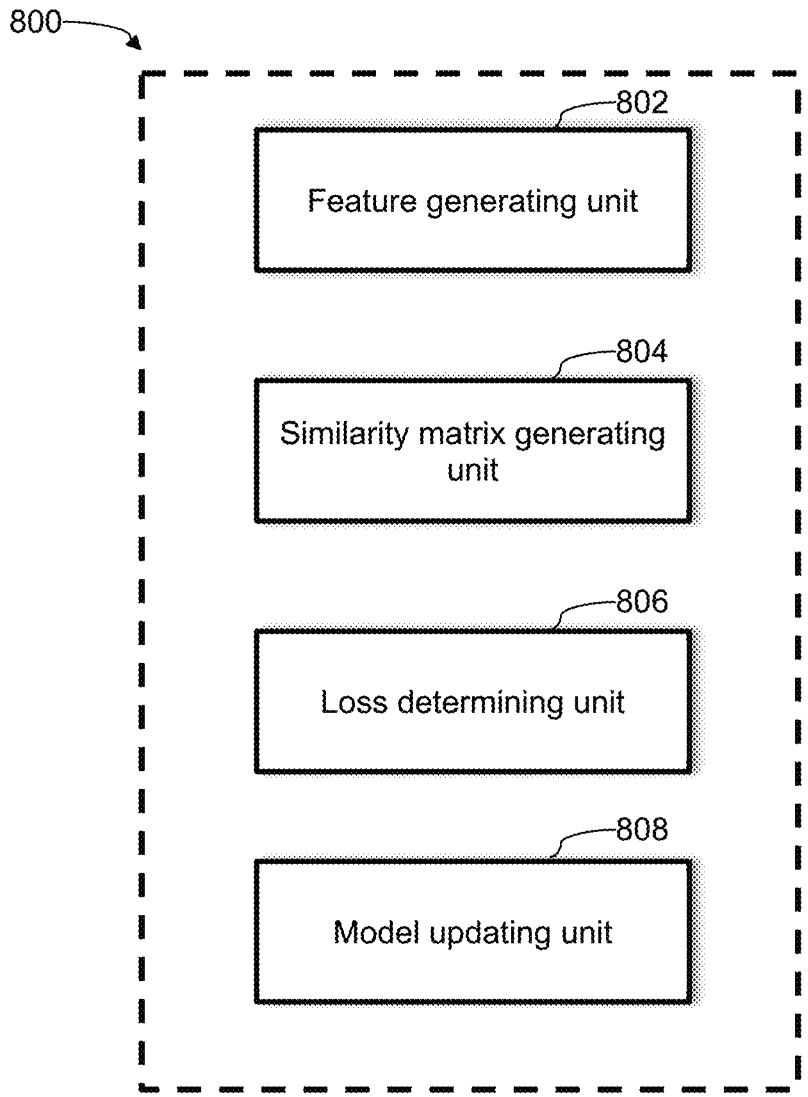
FIG. 8 illustrates a schematic block diagram of an apparatus for training a model according to some embodiments of the present disclosure.

FIG. 8 illustrates a schematic block diagram of apparatus 800 for training a model according to some embodiments of the present disclosure. Apparatus 800 includes feature generating unit 802, similarity matrix generating unit 804, loss determining unit 806, and model updating unit 808.

Feature generating unit 802 is configured to generate a first group of features and a second group of features respectively from a first sample set and a second sample set based on the model. The first sample set is of a first category, and the second sample set is of a second category different from the first category. The first sample set may be positive samples, the second sample may be negative samples, or vice versa.

Similarity matrix generating unit 804 is configured to generate a first similarity matrix for the first sample set and the second sample set based on the first group of features and the second group of features. In some embodiments, rows and columns of the first similarity matrix correspond to samples in the first sample set and the second sample set in sequence. Similarity matrix generating unit 804 may further, for elements in the first similarity matrix, determine a similarity between features of samples corresponding to rows of the elements and features of samples corresponding to columns of the elements.

Loss determining unit 806 is configured to determine a first loss for the first sample set and the second sample set based on the first similarity matrix. In some embodiments, loss determining unit 806 may further be configured to determine a sum of a first group of elements in the first similarity matrix indicating a similarity between features of samples in the first sample set and features of samples in the second sample set; determine a sum of a second group of elements on diagonal lines of the first similarity matrix; and determine the first loss based on a ratio of the sum of the first group of elements to the sum of the second group of elements.

Model updating unit 808 is configured to update the model based on the first loss.

In some embodiments, similarity matrix generating unit 804 may further generate more similarity matrices based on one or more dimensionality reduction features obtained by converting the first group of features and the second group of features. Apparatus 800 may further include a feature converting unit. The feature converting unit is configured to convert the first group of features and the second group of features into a first group of dimensionality reduction features and a second group of dimensionality reduction features respectively. Dimensions of the first group of dimensionality reduction features and the second group of dimensionality reduction features are smaller than dimensions of the first group of features and the second group of features. Thus, similarity matrix generating unit 804 generates a second similarity matrix based on the first group of dimensionality reduction features and the second group of dimensionality reduction features.

In some embodiments, similarity matrix generating unit 804 may add a perturbation factor to elements in the matrices to adjust the generated first similarity matrix and second similarity matrix.

Correspondingly, loss determining unit 806 may determine a first additional loss based on the second similarity matrix. Model updating unit 808 may update the model based on the first loss and the first additional loss.

In some embodiments, apparatus 800 may further include a sample set selecting unit. The sample set selecting unit is configured to select the first sample set and the second sample set from a plurality of sample sets, wherein the plurality of sample sets are of categories different from each other.

In some embodiments, the sample set selecting unit may further be configured to select a third sample set and a fourth sample set from the plurality of sample sets. Thus, feature generating unit 802 generates a third group of features from the third sample set and a fourth group of features from the fourth sample set based on the model. Similarity matrix generating unit 804 may generate a third similarity matrix for the third sample set and the fourth sample set based on the third group of features and the fourth group of features. Loss determining unit 806 may determine a second loss for the third sample set and the fourth sample set based on the third similarity matrix. Loss determining unit 806 may further determine a second additional loss based on dimensionality reduction features obtained by converting the third group of features and the fourth group of features. Model updating unit 808 is further configured to determine a total loss based on at least one of the first loss, the second loss, the first additional loss, and the second additional loss, and update the model based on the total loss.

Figure 9:
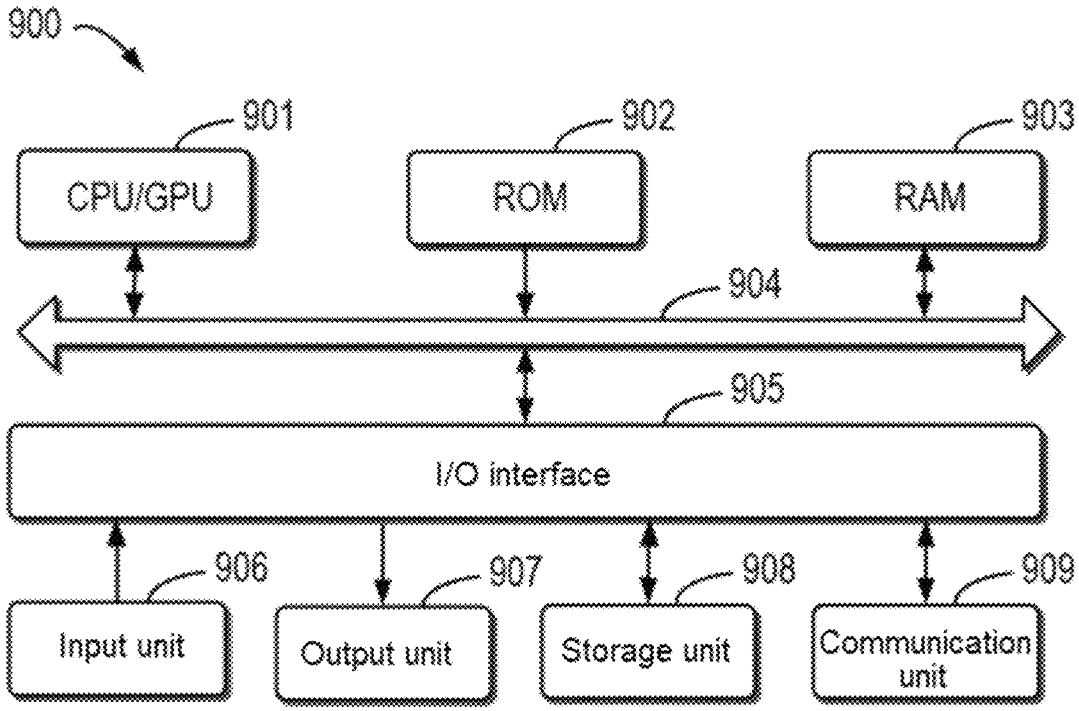
FIG. 9 shows a schematic block diagram of an example device that may be configured to implement an embodiment of the present disclosure.

FIG. 9 shows a schematic block diagram of example device 900 that may be configured to implement embodiments of the present disclosure. For example, method 200 and apparatus 800 for training a model according to embodiments of the present disclosure may be both implemented by device 900. As shown in the figure, device 900 includes central processing unit (CPU) and/or graphic processing unit (GPU) 901 that may perform various appropriate actions and processing according to computer program instructions stored in read-only memory (ROM) 902 or computer program instructions loaded from storage unit 908 to random access memory (RAM) 903. Various programs and data required for the operation of device 900 may also be stored in RAM 903. CPU/GPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, such as method 200, may be executed by CPU/GPU 901. For example, in some embodiments, method 200 may be implemented as a computer software program that is tangibly included in a machine-readable medium, such as storage unit 908. In some embodiments, part or all of the computer program may be loaded and/or installed onto device 900 via ROM 902 and/or communication unit 909. When the computer program is loaded into RAM 903 and executed by CPU/GPU 901, one or more actions of method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product implemented according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings.

For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various implementations of the present disclosure have been described above. The foregoing description is illustrative rather than exhaustive, and is not limited to the disclosed implementations. Numerous modifications and alterations will be apparent to persons of ordinary skill in the art without departing from the scope and spirit of the illustrated implementations. The selection of terms used herein is intended to best explain the principles and practical applications of the implementations or the improvements to technologies on the market, so as to enable persons of ordinary skill in the art to understand the implementations disclosed herein.

What is claimed is:

1. A method, comprising:

deploying a machine learning model in a processor-based machine learning system, the machine learning model comprising a plurality of adjustable parameters;

implementing a contrastive learning component in the processor-based machine learning system for training the machine learning model, the contrastive learning component having an input coupled to a feature output of the machine learning model and an output coupled to a parameter adjustment input of the machine learning model;

generating, in the processor-based machine learning system, a first group of features and a second group of features respectively from a first sample set and a second sample set based on the machine learning model, by applying the first and second sample sets to a sample input of the machine learning model, and extracting the first and second groups of features from the respective first and second sample sets in the machine learning model, wherein the first sample set is of a first category, and the second sample set is of a second category different from the first category;

applying the extracted first and second groups of features to the input of the contrastive learning component;

generating, in the contrastive learning component of the processor-based machine learning system, a first similarity matrix for the first sample set and the second sample set based on the first group of features and the second group of features;

converting the first group of features and the second group of features into a first group of dimensionality reduction features and a second group of dimensionality reduction features respectively, wherein dimensions of the first group of dimensionality reduction features and the second group of dimensionality reduction features are smaller than dimensions of the first group of features and the second group of features;

generating a second similarity matrix for the first sample set and the second sample set based on the first group of dimensionality reduction features and the second group of dimensionality reduction features;

determining, in the contrastive learning component of the processor-based machine learning system, a first loss for the first sample set and the second sample set based on the first similarity matrix, wherein determining the first loss comprises processing at least portions of the first similarity matrix utilizing a processor-implemented entropy minimization function that is configured to increase weights between pairs of samples each having a same category and to decrease weights between pairs of samples having respective different categories;

determining a second loss for the first sample set and the second sample set based on the second similarity matrix; and training the machine learning model, under control of the contrastive learning component of the processor-based machine learning system, by updating at least a subset of the adjustable parameters of the machine learning model based on the first loss and the second loss.

2. The method according to claim 1, wherein rows and columns of the first similarity matrix correspond to samples in the first sample set and the second sample set in sequence, and generating the first similarity matrix for the first sample set and the second sample set comprises:

for elements in the first similarity matrix, determining a similarity between features of samples corresponding to rows of the elements and features of samples corresponding to columns of the elements.

3. The method according to claim 2, further comprising:

adjusting the elements in the first similarity matrix by using a perturbation factor.

4. The method according to claim 1, wherein determining the first loss for the first sample set and the second sample set comprises:

determining a sum of a first group of elements in the first similarity matrix indicating a similarity between features of samples in the first sample set and features of samples in the second sample set;

determining a sum of a second group of elements on diagonal lines of the first similarity matrix; and determining the first loss based on a ratio of the sum of the first group of elements to the sum of the second group of elements.

5. The method according to claim 1, further comprising:

selecting the first sample set and the second sample set from a plurality of sample sets, wherein the plurality of sample sets are of categories different from each other.

6. The method according to claim 5, further comprising:

selecting a third sample set and a fourth sample set from the plurality of sample sets;

generating a third group of features and a fourth group of features respectively from the third sample set and the fourth sample set based on the machine learning model;

generating a third similarity matrix for the third sample set and the fourth sample set based on the third group of features and the fourth group of features;

determining a third loss for the third sample set and the fourth sample set based on the third similarity matrix; and updating the machine learning model based on the first loss, the second loss and the third loss.

7. An electronic device, comprising:

at least one processing unit; and at least one memory that is coupled to the at least one processing unit and stores instructions for execution by the at least one processing unit, wherein the instructions, when executed by the at least one processing unit, cause the electronic device to perform the method according claim 1.

8. A computer program product, comprising a computer-readable storage medium storing machine-executable instructions that, when executed by a device, cause the device to perform the method according to claim 1.

9. An apparatus, comprising:

a processor-based machine learning system comprising a machine learning model and a contrastive learning component for training the machine learning model, the contrastive learning component having an input coupled to a feature output of the machine learning model and an output coupled to a parameter adjustment input of the machine learning model;

a feature generating unit, configured to generate, in the processor-based machine learning system, a first group of features and a second group of features respectively from a first sample set and a second sample set based on the machine learning model, by applying the first and second sample sets to a sample input of the machine learning model, and extracting the first and second groups of features from the respective first and second sample sets in the machine learning model, wherein the first sample set is of a first category, and the second sample set is of a second category different from the first category, and wherein the extracted first and second groups of features are applied to the input of the contrastive learning component;

a similarity matrix generating unit, configured to generate, in the contrastive learning component of the processor-based machine learning system, a first similarity matrix for the first sample set and the second sample set based on the first group of features and the second group of features;

a feature converting unit, configured to convert the first group of features and the second group of features into a first group of dimensionality reduction features and a second group of dimensionality reduction features respectively, wherein dimensions of the first group of dimensionality reduction features and the second group of dimensionality reduction features are smaller than dimensions of the first group of features and the second group of features;

the similarity matrix generating unit being further configured to generate a second similarity matrix for the first sample set and the second sample set based on the first group of dimensionality reduction features and the second group of dimensionality reduction features;

a loss determining unit, configured to determine, in the contrastive learning component of the processor-based machine learning system, a first loss for the first sample set and the second sample set based on the first similarity matrix, wherein determining the first loss comprises processing at least portions of the first similarity matrix utilizing a processor-implemented entropy minimization function that is configured to increase weights between pairs of samples each having a same category and to decrease weights between pairs of samples having respective different categories;

the loss determining unit being further configured to determine a second loss for the first sample set and the second sample set based on the second similarity matrix; and a model updating unit, configured to train the machine learning model, under control of the contrastive learning component of the processor-based machine learning system, by updating at least a subset of adjustable parameters of the machine learning model based on the first loss and the second loss.

10. The apparatus according to claim 9, wherein rows and columns of the first similarity matrix correspond to samples in the first sample set and the second sample set in sequence, and the similarity matrix generating unit is further configured to:

for elements in the first similarity matrix, determine a similarity between features of samples corresponding to rows of the elements and features of samples corresponding to columns of the elements.

11. The apparatus according to claim 10, wherein the similarity matrix generating unit is further configured to:

adjust the elements in the first similarity matrix by using a perturbation factor.

12. The apparatus according to claim 9, wherein the loss determining unit is further configured to:

determine a sum of a first group of elements in the first similarity matrix indicating a similarity between features of samples in the first sample set and features of samples in the second sample set;

determine a sum of a second group of elements on diagonal lines of the first similarity matrix; and determine the first loss based on a ratio of the sum of the first group of elements to the sum of the second group of elements.

13. The apparatus according to claim 9, further comprising:

a sample set selecting unit, configured to select the first sample set and the second sample set from a plurality of sample sets, wherein the plurality of sample sets are of categories different from each other.

14. The apparatus according to claim 13, further comprising:

the sample set selecting unit, further configured to select a third sample set and a fourth sample set from the plurality of sample sets;

the feature generating unit, further configured to generate a third group of features and a fourth group of features respectively from the third sample set and the fourth sample set based on the machine learning model;

the similarity matrix generating unit, further configured to generate a third similarity matrix for the third sample set and the fourth sample set based on the third group of features and the fourth group of features;

the loss determining unit, further configured to determine a third loss for the third sample set and the fourth sample set based on the third similarity matrix; and the model updating unit, further configured to update the machine learning model based on the first loss, the second loss and the third loss.

15. A computer-readable storage medium, comprising machine-executable instructions that, when executed by a device, cause the device to perform actions comprising:

deploying a machine learning model in a processor-based machine learning system, the machine learning model comprising a plurality of adjustable parameters;

implementing a contrastive learning component in the processor-based machine learning system for training the machine learning model, the contrastive learning component having an input coupled to a feature output of the machine learning model and an output coupled to a parameter adjustment input of the machine learning model;

generating, in the processor-based machine learning system, a first group of features and a second group of features respectively from a first sample set and a second sample set based on the machine learning model, by applying the first and second sample sets to a sample input of the machine learning model, and extracting the first and second groups of features from the respective first and second sample sets in the machine learning model, wherein the first sample set is of a first category, and the second sample set is of a second category different from the first category;

applying the extracted first and second groups of features to the input of the contrastive learning component;

generating, in the contrastive learning component of the processor-based machine learning system, a first similarity matrix for the first sample set and the second sample set based on the first group of features and the second group of features;

converting the first group of features and the second group of features into a first group of dimensionality reduction features and a second group of dimensionality reduction features respectively, wherein dimensions of the first group of dimensionality reduction features and the second group of dimensionality reduction features are smaller than dimensions of the first group of features and the second group of features;

generating a second similarity matrix for the first sample set and the second sample set based on the first group of dimensionality reduction features and the second group of dimensionality reduction features;

determining, in the contrastive learning component of the processor-based machine learning system, a first loss for the first sample set and the second sample set based on the first similarity matrix, wherein determining the first loss comprises processing at least portions of the first similarity matrix utilizing a processor-implemented entropy minimization function that is configured to increase weights between pairs of samples each having a same category and to decrease weights between pairs of samples having respective different categories;

determining a second loss for the first sample set and the second sample set based on the second similarity matrix; and training the machine learning model, under control of the contrastive learning component of the processor-based machine learning system, by updating at least a subset of the adjustable parameters of the machine learning model based on the first loss and the second loss.

16. The computer-readable storage medium according to claim 15, wherein rows and columns of the first similarity matrix correspond to samples in the first sample set and the second sample set in sequence, and generating the first similarity matrix for the first sample set and the second sample set comprises:

for elements in the first similarity matrix, determining a similarity between features of samples corresponding to rows of the elements and features of samples corresponding to columns of the elements.

17. The computer-readable storage medium according to claim 16, wherein the actions further comprise:

adjusting the elements in the first similarity matrix by using a perturbation factor.

18. The computer-readable storage medium according to claim 15, wherein determining the first loss for the first sample set and the second sample set comprises:

determining a sum of a first group of elements in the first similarity matrix indicating a similarity between features of samples in the first sample set and features of samples in the second sample set;

determining a sum of a second group of elements on diagonal lines of the first similarity matrix; and determining the first loss based on a ratio of the sum of the first group of elements to the sum of the second group of elements.

19. The computer-readable storage medium according to claim 15, wherein the actions further comprise:

selecting the first sample set and the second sample set from a plurality of sample sets, wherein the plurality of sample sets are of categories different from each other.

20. The computer-readable storage medium according to claim 19, wherein the actions further comprise:

selecting a third sample set and a fourth sample set from the plurality of sample sets;

generating a third group of features and a fourth group of features respectively from the third sample set and the fourth sample set based on the machine learning model;

generating a third similarity matrix for the third sample set and the fourth sample set based on the third group of features and the fourth group of features;

determining a third loss for the third sample set and the fourth sample set based on the third similarity matrix; and updating the machine learning model based on the first loss, the second loss and the third loss.

* * * * *